US012202342B2

(12) United States Patent
Esders et al.

(10) Patent No.: US 12,202,342 B2
(45) Date of Patent: Jan. 21, 2025

(54) ELECTRONIC DEVICE HAVING DISPLAY CARRIER INCLUDING DISPLAY WITH TRANSPARENT CASTABLE POLYMER MATERIAL OVERLAYING THE DISPLAY CARRIER AND THE DISPLAY

(71) Applicant: KOSTAL Automobil Elektrik GmbH & Co. KG, Luedenscheid (DE)

(72) Inventors: Berthold Esders, Schalksmuehle (DE); Arno Laubrock, Dortmund (DE); Norbert Bendicks, Schalksmuehle (DE); Stephanie Goehl, Luedenscheid (DE)

(73) Assignee: KOSTAL AUTOMOBIL ELEKTRIK GMBH & CO. KG, Luedenscheid (DE)

( * ) Notice: Subject to any disclaimer, the term of this patent is extended or adjusted under 35 U.S.C. 154(b) by 85 days.

(21) Appl. No.: 18/298,433

(22) Filed: Apr. 11, 2023

(65) Prior Publication Data

US 2023/0249553 A1  Aug. 10, 2023

Related U.S. Application Data

(63) Continuation of application No. PCT/EP2021/086251, filed on Dec. 16, 2021.

(30) Foreign Application Priority Data

Dec. 17, 2020  (DE) .................... 10 2020 007 710.2

(51) Int. Cl.
*H04N 7/18* (2006.01)
*B60K 35/00* (2006.01)
*B60K 35/22* (2024.01)

(52) U.S. Cl.
CPC .............. *B60K 35/00* (2013.01); *B60K 35/22* (2024.01); *B60K 2360/682* (2024.01); *B60K 2360/688* (2024.01); *B60K 2360/691* (2024.01)

(58) Field of Classification Search
CPC ...................................................... B60K 35/00
(Continued)

(56) References Cited

U.S. PATENT DOCUMENTS

2008/0200718 A1* 8/2008 Hayes ................ C08G 18/3281
560/26
2009/0183819 A1 7/2009 Matsuhira
(Continued)

FOREIGN PATENT DOCUMENTS

DE  202015002460 U1  7/2016
EP      2529912 A1  12/2012

OTHER PUBLICATIONS

The International Bureau of WIPO, International Preliminary Report on Patentability for International Application No. PCT/EP2021/086251 issued Jun. 13, 2023.
(Continued)

*Primary Examiner* — Leron Beck
(74) *Attorney, Agent, or Firm* — Brooks Kushman P.C.

(57) ABSTRACT

An electronic device includes a display carrier, a layer of transparent castable polymer material, and a display. The display carrier has an opening and an outer side. The layer of polymer material is on the outer side of the display carrier. The display is arranged within or beneath the aperture of the display carrier. The outer side of the display carrier and the aperture are flooded or over-molded with the polymer material.

9 Claims, 3 Drawing Sheets

(58) Field of Classification Search
USPC .......................................................... 348/837
See application file for complete search history.

(56) References Cited

U.S. PATENT DOCUMENTS

| | | | |
|---|---|---|---|
| 2011/0247158 A1* | 10/2011 | Jungnickel | G09F 13/06 |
| | | | 40/541 |
| 2012/0306757 A1 | 12/2012 | Keist et al. | |
| 2013/0194650 A1* | 8/2013 | Roth | B60R 1/12 |
| | | | 359/267 |
| 2015/0351272 A1 | 12/2015 | Wildner et al. | |
| 2019/0033651 A1 | 1/2019 | Lee et al. | |

OTHER PUBLICATIONS

European Patent Office, International Search Report for International Application No. PCT/EP2021/086251, mailed Mar. 18, 2022.
German Patent Office, German Search Report for German Patent Application No. DE 10 2020 007 710.2, dated Sep. 16, 2021.

* cited by examiner

ELECTRONIC DEVICE HAVING DISPLAY CARRIER INCLUDING DISPLAY WITH TRANSPARENT CASTABLE POLYMER MATERIAL OVERLAYING THE DISPLAY CARRIER AND THE DISPLAY

CROSS-REFERENCE TO RELATED APPLICATIONS

This application is a continuation of International Application No. PCT/EP2021/086251, published in German, with an international filing date of Dec. 16, 2021, which claims priority to DE 10 2020 007 710.2, filed Dec. 17, 2020, the disclosure of which is hereby incorporated by reference herein.

TECHNICAL FIELD

The present invention relates to an electronic device including a display carrier at which a display is situated, the display carrier on its outer side being provided with a layer made of a transparent castable polymer material.

BACKGROUND

The interiors of modern vehicles are increasingly being fitted with display applications. There is also the desire to install or mount these displays behind closed surfaces. Components having a transparent partial area or a full-surface transparent layer behind a colored component with a window are currently being produced using one-component or two-component injection molding technology. Instead of using a colored component, a decorative film may be back-molded. The window may be implemented by pressure on the film.

Such components generally contain mechanical stresses that have a mechanical or visual (optical) effect on the application of a display. Although these stresses may be minimized by selecting certain plastics and certain processes, they cannot be completely eliminated.

A generic electronic device is known from German Utility Model DE 20 2015 002 460 U1. This document describes an electronic device in which the outer side of a housing element is coated with a polymer material. An electronics system, on the other hand, is arranged on the inner side of the housing element. This is disadvantageous when the electronics system includes a display whose representations are to be discernible from the outer side of the housing element.

SUMMARY

An object is an electronic device that avoids the above-mentioned disadvantages.

In embodiments of the present invention, an electronic device includes a display carrier on which a display is arranged, and which is provided, on its outer face, with a layer made of a transparent castable polymer material. The display carrier has an aperture, within or below which the display is arranged. The outer face of the display carrier and the aperture of the display carrier are flooded or over-molded with the polymer material.

Embodiments of the present invention achieve the above object and/or other objects in that the display carrier has an aperture within or below which the display is situated, and that the outer side of the display carrier and the aperture of the display carrier are flooded or over-molded with the transparent castable polymer material.

The display carrier thus has a continuous outer side, having a uniform appearance, made of a polymer material, with the presentation side of the display being arranged in direct contact with the polymer material, or being situated beneath the polymer material using an optical adhesive or coupling agent, so that the material of the display carrier has no effect on the representations of the display.

It is also advantageous that due to the installation according to the present invention at the display carrier, a so-called cover glass in front of the display may be dispensed with, as the display may be adhesively bonded to the display carrier in a visually seamless manner due to the final over-molding or flooding with the polymer material.

It is particularly advantageous to provide a polyurethane as the polymer material.

BRIEF DESCRIPTION OF THE DRAWINGS

Several exemplary embodiments of an electronic device in accordance with the present invention are illustrated and explained in greater detail below with reference to the drawings, which include the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
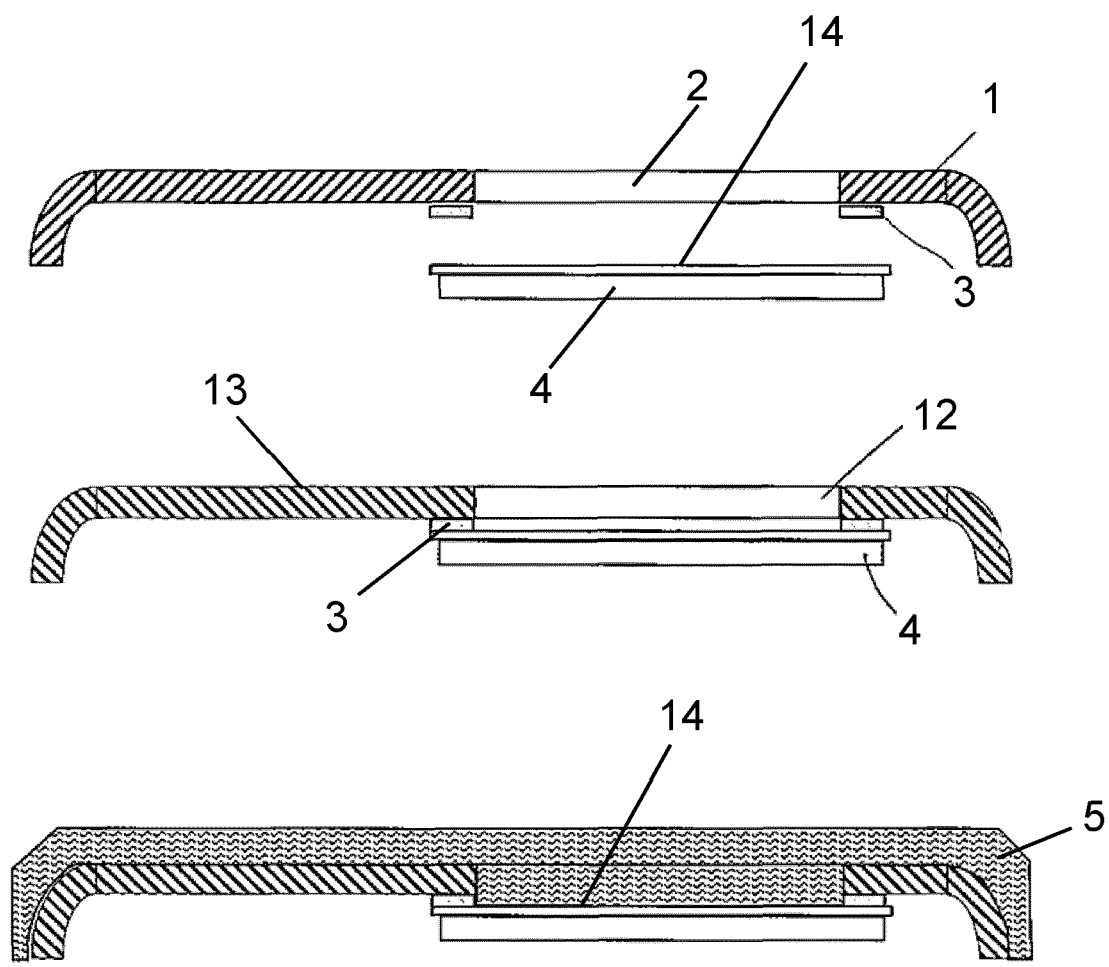
FIG. 1 illustrates a first exemplary embodiment of an electronic device.
Figure 2:
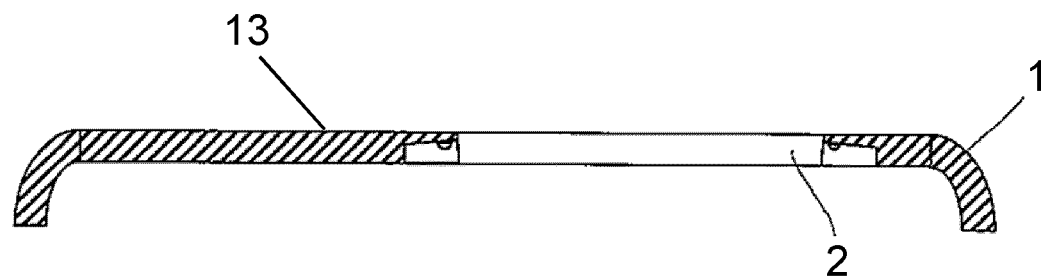
FIG. 2 illustrates a second exemplary embodiment of the electronic device.
Figure 2:
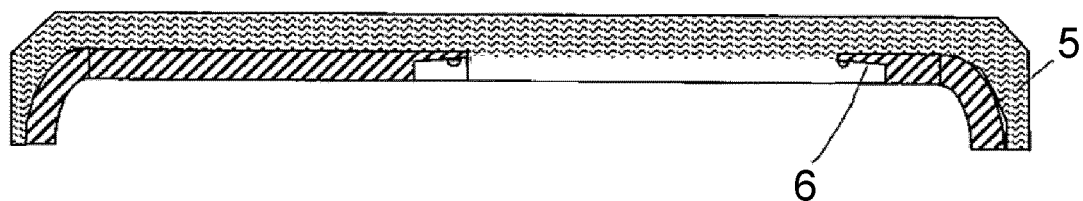
Figure 2:
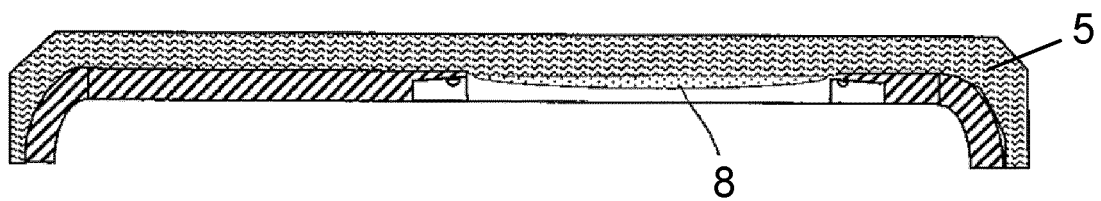
Figure 2:
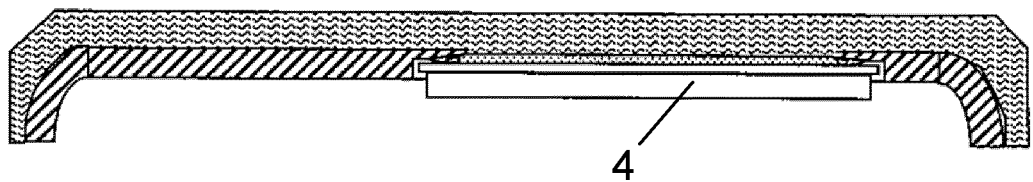
Figure 3:
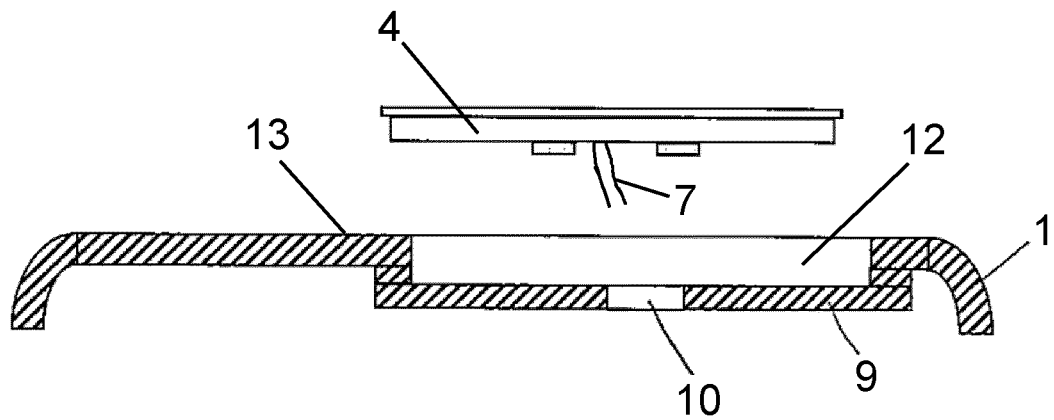
FIG. 3 illustrates a third exemplary embodiment of the electronic device.
Figure 3:
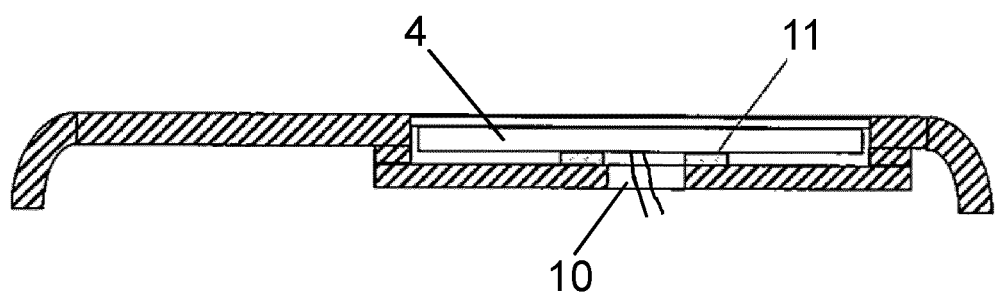
Figure 3:
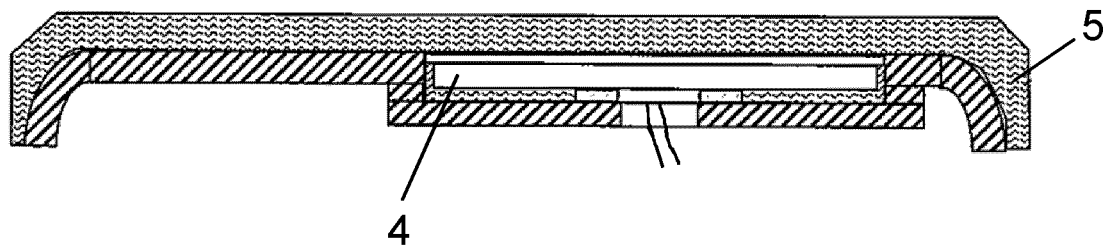

For explaining the structure and the design, FIGS. 1, 2, and 3 schematically illustrate different manufacturing phases of respective embodiment variants of an electronic device, with each of FIGS. 1, 2, and 3 depicting a chronological sequence from top to bottom. In FIGS. 1, 2, and 3, parts having the same or equivalent function or effect, including different embodiments, have been designated with the same reference numerals.

FIG. 1 illustrates a first exemplary embodiment of the electronic device. The electronic device includes a display carrier 1. Display carrier 1 is manufactured, preferably by injection molding, in a first step. A display 4 is to be arranged on display carrier 1. Display carrier 1 includes an aperture or an opening 2. Aperture 2 is slightly smaller than display 4. An adhesive 3 with which display 4 is adhesively bonded to display carrier 1 is applied in the periphery of aperture 2 in a defined manner. This results in an aperture chamber 12, which is open toward an outer side 13 of display carrier 1, through aperture 2 and the attached display 4 at the display carrier.

After this operation is completed, display carrier 1 together with display 4 is mounted in a flooding mold. After the mold is closed, display carrier 1 is flooded with a polymer material 5 in a vertical orientation from bottom to top and cured. As the result of which, aperture chamber 12 is also completely filled with polymer material 5. The result is a surface which is closed toward the user, and which provides additional protection of both display 4 and outer side 13 of display carrier 1 by polymer material 5. A polyurethane may preferably be used as a suitable polymer material 5.

Due to display 4 already being mounted on display carrier 1 during the flooding operation, polymer material 5 rests seamlessly on display surface 14 of the display after the flooding.

FIG. 2 illustrates a second exemplary embodiment of the electronic device. This variant likewise provides that a window-like aperture 2 is situated in display carrier 1. A shoulder 6 is provided in display carrier 1 at the edge of aperture 2. Shoulder 6 protrudes into aperture 2 in such a way that display 4 may submerge into the aperture and be supported on the shoulder.

Outer side 13 of display carrier 1 is flooded in an injection mold (not shown). Suitably shaped cores in the injection mold tool ensure that polymer material 5 is either not introduced into aperture 2 or is introduced only slightly into the aperture.

In the next step, display carrier 1 is horizontally oriented. After polymer material 5 has cured (hardened), in the area of aperture 2 a liquid optical adhesive 8 is applied to the side of the cured polymer material 5 facing the aperture. Display 4 is subsequently attached to shoulder 6 and joined to polymer material 5 and display carrier 1 by use of the liquid optical adhesive 8. Display 4 is thereby mounted horizontally in aperture 2.

In comparison to the first exemplary embodiment illustrated in FIG. 1, the second exemplary embodiment illustrated in FIG. 2 allows display 4 to be installed after display carrier 1 is coated with polymer material 5.

FIG. 3 illustrates a third exemplary embodiment of the electronic device. The third embodiment variant provides that, in a first step, display carrier 1 is shaped by injection molding in such a way that a projection 9 parallel to outer side 13 of display carrier 1 is formed.

Display carrier 1 thus forms an aperture chamber 12 that is open toward outer side 13 of the display carrier. The depth of aperture chamber 12 corresponds to the height of display 4 to be attached. Display 4 has an electrical connection 7, explicitly illustrated in FIG. 3, made up of multiple schematically depicted connecting lines.

Situated inside projection 9 is an opening 10 through which electrical connection 7 of display 4 may be led. A seal 11 that is made up of a stamped adhesive frame or a liquid adhesive is situated around opening 10.

In the subsequent step, display 4 is inserted into aperture chamber 12 with connection 7 being led through opening 10.

Lastly, flooding is carried out over and around display carrier 1 and display 4 in a vertical position to avoid air being trapped.

LIST OF REFERENCE NUMERALS 1 display carrier (or display support)
2 aperture (or panel opening)
3 (glue) adhesive
4 display
5 (transparent castable) polymer material
6 recess
7 electrical connection
8 liquid optical adhesive
9 projection (or molding)
10 opening
11 seal
12 aperture chamber
13 outer side (of the display carrier)
14 display surface While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electronic device comprising:
a display carrier having an aperture and an outer side and an inner side, the aperture extending between the outer side and the inner side of the display carrier and thus forming an aperture chamber that is opened at the outer side and the inner side of the display carrier;
a layer of transparent castable polymer material on the outer side of the display carrier; and
a display arranged on the inner side of the display carrier beneath the aperture of the display carrier; and
the outer side of the display carrier and the aperture of the display carrier are flooded or over-molded with the transparent castable polymer material, the aperture chamber is entirely filled by the transparent castable polymer material, and the transparent castable polymer material is in direct contact against a display surface of the display, and the display surface of the display is viewable directly through the transparent castable polymer material.

2. An electronic device comprising:
a display carrier having an aperture and an outer side and an inner side, the aperture extending between the outer side and the inner side of the display carrier and thus forming an aperture chamber that is opened at the outer side and the inner side of the display carrier;
a layer of transparent castable polymer material on the outer side of the display carrier; and
a display, a first portion of the display is arranged within the aperture chamber and a remaining portion of the display is arranged on the inner side of the display carrier beneath the aperture of the display carrier, the first portion of the display having a display surface oriented towards the outer side of the display carrier; and
the outer side of the display carrier and the aperture of the display carrier are flooded or over-molded with the transparent castable polymer material, and the transparent castable polymer material is attached to the display surface of the first portion of the display by a liquid adhesive, and the display surface of the first portion of the display is viewable directly through the transparent castable polymer material.

3. An electronic device comprising:
a display carrier having an aperture and an outer side and an inner side, the aperture extending between the outer side and the inner side of the display carrier and thus forming an aperture chamber that is opened at the outer side and the inner side of the display carrier, the display carrier further having a projection arranged on the inner side of the display carrier beneath and spaced apart from the aperture;

a layer of transparent castable polymer material on the outer side of the display carrier; and a display, a first portion of the display being arranged within the aperture chamber, a remaining portion of the display being arranged on the inner side of the display carrier beneath the aperture of the display carrier and being closed off by the projection of the display carrier, and the first portion of the display having a display surface that is oriented towards the outer side of the display carrier; and the outer side of the display carrier and the aperture of the display carrier are flooded or over-molded with the transparent castable polymer material, the aperture chamber to the extent not filled in by the display is filled with the transparent castable polymer material, and the transparent castable polymer material is in contact against the display surface of the first portion of the display, and the display surface of the first portion of the display is viewable directly through the transparent castable polymer material.

4. The electronic device according to claim 2 wherein:
the transparent castable polymer material is a polyurethane.

5. The electronic device according to claim 1 wherein:
the layer of transparent castable polymer material has a continuous, uniform appearance on the outer side of the display carrier.

6. The electronic device according to claim 2 wherein:
the transparent castable polymer material is a polyurethane.

7. The electronic device according to claim 2 wherein:
the layer of transparent castable polymer material has a continuous, uniform appearance on the outer side of the display carrier.

8. The electronic device according to claim 3 wherein:
the transparent castable polymer material is a polyurethane.

9. The electronic device according to claim 3 wherein:
the layer of transparent castable polymer material has a continuous, uniform appearance on the outer side of the display carrier.

\* \* \* \* \*